United States Patent [19]

Mihara

[11] Patent Number: 5,184,223

[45] Date of Patent: Feb. 2, 1993

[54] ELECTRONIC IMAGING APPARATUS

[75] Inventor: Shinichi Mihara, Tokyo, Japan

[73] Assignee: Olympus Optical Co., Ltd., Tokyo, Japan

[21] Appl. No.: 692,254

[22] Filed: Apr. 26, 1991

[30] Foreign Application Priority Data

Apr. 28, 1990 [JP] Japan .................................. 2-114447
May 29, 1990 [JP] Japan .................................. 2-139468

[51] Int. Cl.$^5$ .............................................. H04N 5/30
[52] U.S. Cl. .................................... 358/209; 359/568;
359/669; 359/670; 359/671
[58] Field of Search ............... 359/668, 669, 670, 671;
382/47; 358/209

[56] References Cited

U.S. PATENT DOCUMENTS

| | | | |
|---|---|---|---|
| 4,672,464 | 6/1987 | Shida | 382/47 |
| 4,805,998 | 2/1989 | Chen et al. | 359/670 |
| 4,872,747 | 10/1989 | Jalkio et al. | 359/669 |

*Primary Examiner*—Herbert Goldstein
*Assistant Examiner*—Joseph Colaianni
*Attorney, Agent, or Firm*—Cushman, Darby & Cushman

[57] ABSTRACT

The electronic imaging apparatus comprises an imaging lens system for forming an image of an object at magnifications different between an x-z section and y-z section when the object is placed on a z-axis, an imaging optical system, an image sensor having a photoelectric converting surface substantially perpendicular to the z-axis for receiving the image of the object, and a video signal processing circuit capable of changing a difference in expansion/contraction ratio between a scanning direction and the direction perpendicular thereto for reproducing an image of object on the basis of output signals from the image sensor and is capable of generating video signals for displaying an image substantially similar to the object. This electronic imaging apparatus permits obtaining a very clear reproduced image which is substantially similar to the object.

3 Claims, 5 Drawing Sheets

ELECTRONIC IMAGING APPARATUS

BACKGROUND OF THE INVENTION

1. Field of the Invention

The present invention relates to an electronic imaging apparatus such as an electronic still camera or a video camera.

2. Description of the Prior Art

It is said that the communication in a society sophisticated in information will find its ultimate form in a mode which utilizes electronic images. Those skilled in the art now anticipate a new communication mode in which images are readily available, freely processable and transmittable. TV monitors permit anyone to reproduce and observe images immediately, and communication equipment such as a telephone network or an image transmitter allows immediate transmission of the images to distant places. Further, computers such as personal computers can perform various modes of processings of images which are fed as inputs. In order to improve an electronic still camera so as to be conveniently usable as a terminal device of these new information media, the camera must be designed compact in dimensions and light in weight, or should desirably be as thin as a memorandum-book for convenient use. The known electronic still cameras have external designs which are rather enlarged mainly due to the sizes of the actuators for floppy discs, circuitry and imaging systems including optical systems (lens systems). Speaking of the recording media, the floppy discs are currently being replaced with IC cards, and it is expected that the circuitry will be made far more compact owing to the rapid progress made in the LSI technology. However, the lens system can hardly be made compact, especially in the thickness thereof, by any of the several methods which are conceivable as extension of the conventional concept. When an electronic still camera system is composed in compliance with the NTSC standard, for example, the image surface thereof is a rectangle having an aspect ratio of 3:4, whereby the image formed by the electronic still camera is picked up with an image sensor having an aspect ratio of 3:4 and reproduced on a monitor having the same aspect ratio of 3:4. Therefore, the imaging lens system to be used with the electronic still camera system must form an image with a sufficient amount of light and good qualities over the entire range of the image sensor having the aspect ratio of 3:4. However, the conventional type of imaging lens system has a nearly circular effective surface and forms an image which is larger than the image sensor so as to cover the diagonal length of the monitor screen, thereby constituting a hindrance to compact design of the electronic still camera.

General lens systems comprise large lens components, especially on the most object side, but have circular sections which are selected from the viewpoint of convenient shaping. In order to solve the above-mentioned problem, it is desirable to cut off the portions which allow transmission of the rays which do not serve for forming an image on the effective surface of the image sensor, or to match the external shapes of lenses with the shape of the effective surface of the image sensor. When lenses are cut so as to have a rectangular external shape matched in aspect ratio with the effective area of the image sensor, for example, a surplus step is necessary for manufacturing but a little effect is obtained for thinning the camera to be composed thereof, and simple matching of the external shapes between lenses and the image sensor is not so desirable.

Furthermore, it is irrefutable that the above-mentioned electronic images are generally lower in quality, especially in resolution, than printed images. The lower resolution is mainly due to too small a number of picture elements which are arranged on the image sensor. On an imaging surface measuring 4.8 mm×6.4 mm, for example, 490×670 picture elements are currently arranged. Since a limit has been almost reached in the attempt to increase the number of the picture elements by reducing the size of each picture element, another attempt is currently made to maintain S/N ratio at a high level, for example, by providing a micro lens for each picture element. Accordingly, strict restrictions are imposed on the way to arrange picture elements at a density as high as that on the silver halide film 35 mm full size. Another way to arrange picture elements at a higher density lies in forming a larger image of object so as to obtain an enlarged imaging surface, but this way will inevitably enlarge the optical system and is contrary to the days' trend to use compact optical systems.

By the way, the imaging surface of the image sensor is currently designed as a rectangle having the aspect ratio of 3:4 as described above and this ratio is supposed to be lowered by the standard for the future high quality television. The imaging lens systems to be used with the image sensors must assure satisfactory optical performance at least within the internal ranges of the circumscribed circles of the imaging surfaces (rectangles). So far as an imaging surface has a definite area, the circumscribed circle thereof has a longer radius and the imaging lens system to be used therewith is inevitably enlarged as the imaging surface has a lower aspect ratio.

For an optical system having a definite size, on the other hand, a higher aspect ratio of an imaging surface will oblige to use a smaller number of picture elements, thereby degrading optical efficiency. In other words, when the optical system has a definite size, a square imaging surface has the maximum light receiving area and permits arranging the maximum number of picture elements thereon so far as the size of a single picture element remains unchanged. Since the number of picture elements to be arranged in a vertical row is specified by the standard, resolution in the horizontal direction can be enhanced by arranging an excessive number of picture elements in the horizontal direction. When the imaging surface has the square shape, however, the image reproducing screen in compliance with the NTSC standard has the aspect ratio of 3:4 and a screen having a lower aspect ratio is required for the high quality television.

SUMMARY OF THE INVENTION

An object of the present invention is to provide an electronic imaging apparatus which comprises an imaging optical system for forming a deformed image of an object and is capable of finally reproducing an image substantially similar to the original object by processing video signal outputs from the image sensor.

Another object of the present invention is to provide an electronic imaging apparatus which is so adapted as to improve resolution by using an optical system, as an imaging lens system, which is not rotationally symmetrical nor larger than the conventional optical system.

According to the present invention, these objects are attained by equipping the electronic imaging apparatus with an imaging optical system which is so adapted as to form an image of an object with an imaging lens system having different imaging magnifications on the x-y section and the y-z section when the optical axis is taken as the z axis in a three dimensional space expressed by x-y-z coordinates, and to receive this image with an image sensor having a photoelectric converting surface nearly perpendicular to the optical axis, and a video signal processing circuit which is capable of setting magnifying and contracting ratios different in the scanning direction and the direction perpendicular thereto at a stage to reproduce the image of object on the basis of output signals from the image sensor, and generating video signals for displaying an image nearly similar to the object.

The electronic imaging apparatus according to the present invention forms, within a range of x:y, an image of object in a shape which is deformed at an anamorphic ratio of (x/a):(y/b) on the image sensor which is equipped with the photoelectronic converting surface having an aspect ratio of a:b (a/b<x/y) by selecting imaging magnifications in the vertical direction and the horizontal direction which are different from the original aspect ratio of the image screen of the imaging system (for example 3:4 specified by the NTSC standard). The image formed with the video signals obtained from the image sensor is expanded at ratios different between the two directions by the video signal processing circuit so as to reproduce an image having the ratio of x:y on a monitor.

Since the electronic imaging apparatus according to the present invention forms an image at a ratio which is different from the original aspect ratio of the imaging system, the imaging apparatus can be composed of lenses having smaller outside diameters and designed so as to be compact, especially thin.

Further, since the electronic imaging apparatus according to the present invention is adapted to receive an image which is formed at a ratio different from the original aspect ratio of the imaging system with an image sensor having a square imaging surface, the imaging apparatus permits enlarging the imaging surface and can have high resolution.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

Prior to description of the preferred embodiments of the present invention, explanation will be made with reference to FIG. 1 on the principle to form a vertically contracted image of an object and vertically expand the image by a video signal processing circuit.

Figure 1:
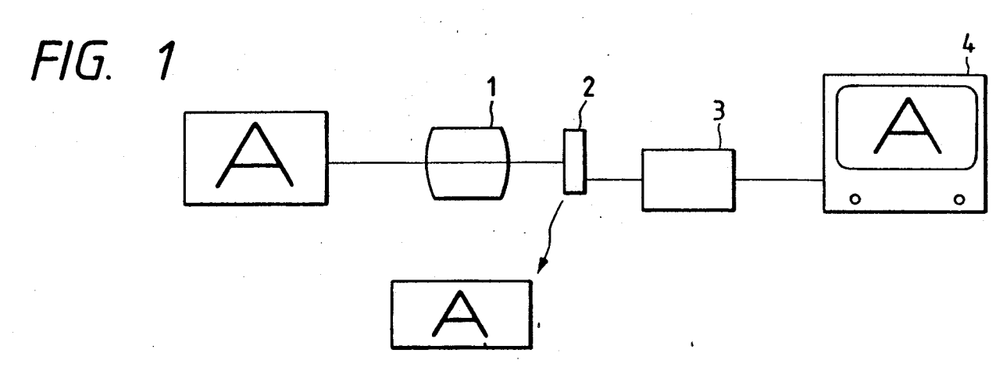
FIG. 1 and FIG. 2 are conceptional diagrams descriptive of the principle of the electronic imaging apparatus according to the present invention.

In FIG. 1, the reference numeral 1 represents an optical system which is designed as the so-called anamorphic lens system which forms a vertically compressed image of a letter A. This image is received by an image sensor 2 which has a photoelectric converting surface narrower in the vertical direction than the original image surface and converted into electric signals. The image is displayed at the original aspect ratio on a monitor 4 by vertically elongating the video signals obtained from the image sensor 2 with a video signal processing circuit 3.

In order to shorten the shorter side of the effective surface of the lens component which has the largest effective area (the largest outside diameter) when the anamorphic system is used as the imaging lens system, the anamorphic optical system is insignificant unless it comprises lens elements which have focal lengths that differ between the x direction and the y direction, and are arranged in said lens component or a lens component located on the object side thereof. Since the lens component arranged on the most object side generally has the largest effective area, it is necessary to design this lens component so as to comprise the lens elements which have focal lengths different between the x direction and the y direction. Further, it is almost insignificant to arrange the lens elements having focal lengths different between the x direction and the y direction in a lens component arranged after the lens component located on the most object side. Further, when the imaging lens system is designed as a zoom lens system, the lens elements which have focal lengths different between the x direction and the y direction must be arranged only in a lens component located on the object side of the lens component having the function for variation of magnification. If the lens component having the function for variation of magnification comprises said lens elements, it will be difficult to obtain a variation ratio of magnification which is the same between the x direction and the y direction respectively. Furthermore, it is desirable that the lens component comprising the lens elements having the focal lengths different between the x direction and the y direction has a definite azimuth (tilt around the optical axis). Furthermore, it is desirable that the lens elements having the focal lengths different between the x direction and the y direction are composed of the so-called toric surfaces which have radii of curvature different between the x-z section and the y-z section. When said lens elements are composed of the toric surfaces, the total lens system which is composed of the lens component comprising said lens elements (or the total lens system located between the most object side toric surface and the most image side toric surface) has a total focal lengths different between the x-z section and the y-z section. In this case, it is to be noted that, when the image point of the lens system as a whole is located on the object side of the total lens system (the object to be imaged when no lens is arranged on the object side of the total lens system) is taken as the object point for the total lens system, the conjugate distance on the x-z section must be equal to that on the y-z section, i.e., the image point of the total lens system must be coincident between both the sections. Otherwise, there will undesirably produced astigmatic difference, i.e., the focus point of the image to be finally obtained will not be coincident between the x-z section and the y-z section. When the paraxial astigmatic difference to be produced between the x-z section and the y-z section of the anamorphic optical system is represented by Δd, it is desirable to satisfy the following condition (1):

$$|\Delta d| < 2\delta F/\beta^2 \tag{1}$$

wherein the reference symbol δ represents the length of the shorter side of each picture element arranged on the image sensor, the reference symbol F designates the F number of the imaging lens system and the reference symbol β denotes the magnification of the optical system arranged after said anamorphic optical system.

If the condition (1) is not satisfied, both the sections will undesirably produce remarkable astigmatic difference.

Next, description will be made of the video signal processing circuit. When the image formed by the imaging lens system is contracted in the vertical direction as shown in FIG. 1, for example, it is impossible to reproduce an image similar to the original object by the conventional signal processing. Therefore, the video signal processing circuit expands the image $(b \times z)/(a \times y)$ times as long in the vertical direction so as to reproduce an image similar to the original object. Usable as the video signal processing circuit is one of the circuits which are so adapted as to obtain the specified number of vertical scanning lines, for example, by duplicate use of the information on the same scanning lines out of the video signals provided from an image sensor having vertical scanning lines in a number smaller than that originally specified for the electronic imaging system.

Figure 2:
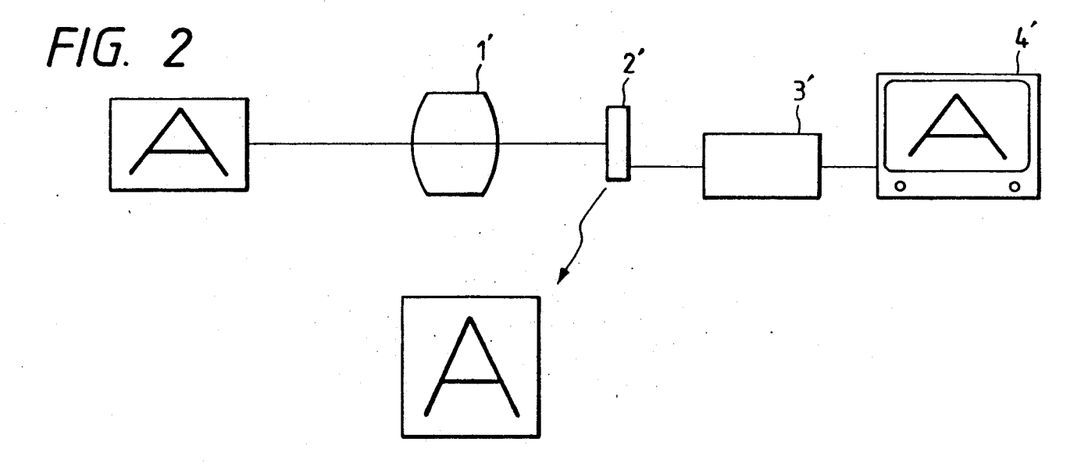

Now, description will be made with reference to FIG. 2 on a case where an imaging lens system 1' designed as an anamorphic optical system forms a vertically expanded image of a letter A selected as an object, an image sensor 2' having a square photoelectric converting surface receives the vertically expanded image, and a video signal processing circuit 3' processes output signals from the image sensor 2' so as to allow an image having the correct aspect ratio to indicate on a monitor 4.

The imaging lens system 1' generally has an image circle which is to be the circumscribed circle of the rectangular photoelectric converting surface of the image sensor 2' and, out of the inscribed rectangles of an image circle having a definite size, the square has the maximum area. Therefore, an image sensor having a square photoelectric converting surface provides the highest utilization efficiency of the rays incident through the imaging lens system, allows a maximum number of picture elements to be arranged thereon so far as area of each picture element remains unchanged, and is advantageous for enhancing resolution. However, it is undesirable to modify the aspect ratio, etc., out of the specification items for television, since they are to be determined on the basis of the human engineering.

Accordingly, the electronic imaging apparatus according to the present invention is adapted to form an image, at an aspect ratio of 1:1, of an object within a range of the aspect ratio of a:b specified by the ordinary standard (for example, 3:4 specified by the NTSC standard) by using an imaging lens system having an anamorphic ratio of $(1/a):(1/b)((1/3):(1/4)=4:3$ in the case of the NTSC standard) and receive the image with the image sensor 2' having the rectangular photoelectric converting surface. When the number of the picture elements to be arranged in the vertical direction on the image sensor is determined so as to be equal to the number of the scanning lines specified by the ordinary standard (525 in the case of the NTSC standard), the number of picture elements to be arranged in the horizontal direction is increased, thereby making it possible to enhance resolution in the horizontal direction. In such a case, the imaging lens system 1' forms an image which is expanded in the vertical direction as compared with an image formed by an ordinary imaging lens system having the same image circle as that of the imaging lens system 1' and it is possible, by elongating each picture element in the vertical direction, to enhance density of the picture elements in the horizontal direction without changing the area of each of the picture elements.

Since the number of the picture elements in the vertical direction is determined in accordance with the selected standard, it is possible to reproduce an image which has the same aspect ratio of a:b as that of the original object (3:4 in the case of the NTSC standard) and obtain high resolution in the horizontal direction by performing the ordinary signal processing after the photoelectric conversion.

In addition, it is possible to reproduce images at desired aspect ratios by using the image contraction/expansion techniques which are known to those skilled in the art.

The preferred embodiments of the anamorphic optical system described with reference to FIG. 1 will be explained below:

EMBODIMENT 1

Figure 3A:
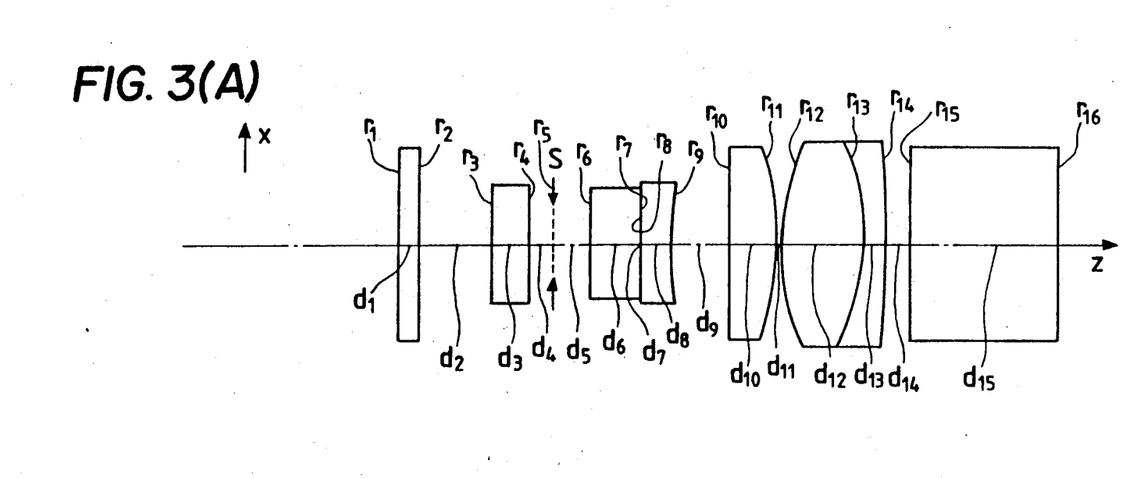
FIG. 3 through FIG. 6 are sectional views illustrating lens arrangements in the embodiments of the present invention which are different from one another.
Figure 3B:
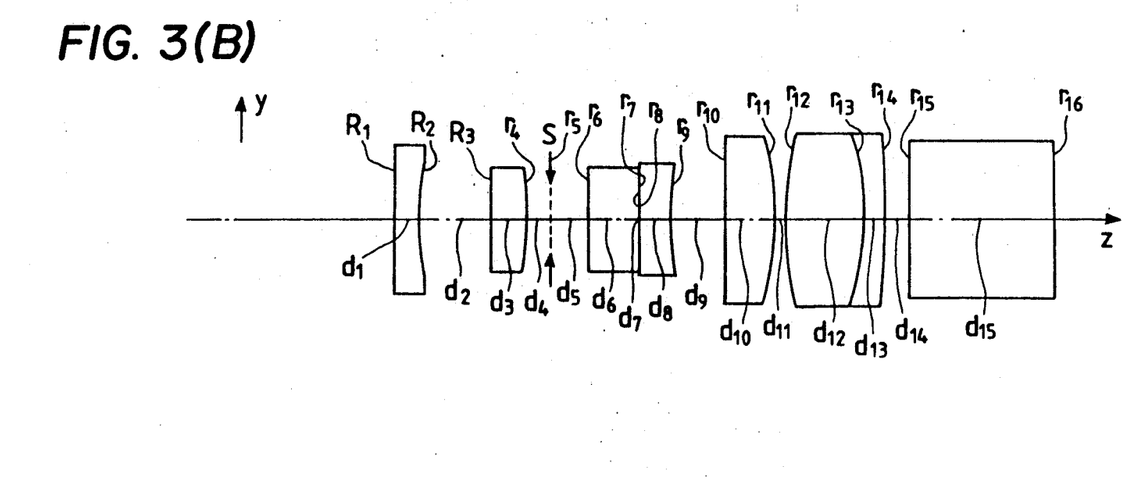

Lens arrangement in Embodiment 1 of the present invention is illustrated in FIG. 3, wherein the reference symbol (A) represents the x-z section and the reference symbol (B) designates the y-z section. The Embodiment 1 has the numerical data listed below:

| | | | |
|---|---|---|---|
| $r_1 = \infty$ | | | |
| | $d_1 = 0.8$ | $n_1 = 1.72916$ | $\nu_1 = 54.68$ |
| $r_2 = \infty$ | | | |
| | $d_2 = 3.0041$ | | |
| $r_3 = \infty$ | | | |
| | $d_3 = 1.5$ | $n_2 = 1.84666$ | $\nu_2 = 23.78$ |
| $r_4 = \infty$ | | | |
| | $d_4 = 1.0$ | | |
| $R_1 = -96.6773$ | | | |
| | $d_1 = 0.8$ | | |
| $R_2 = 9.0611$ | | | |
| | $d_2 = 3.0041$ | | |
| $R_3 = 119.0446$ | | | |
| | $d_3 = 1.5$ | | |
| $r_5 = \infty$ (stop) | | | |
| | $d_5 = 1.5$ | | |
| $r_6 = 33.8324$ | | | |
| | $d_6 = 2.149$ | $n_3 = 1.84666$ | $\nu_3 = 23.78$ |
| $r_7 = -67.3226$ | | | |
| | $d_7 = 0.06$ | | |
| $r_8 = -34.4206$ | | | |
| | $d_8 = 1.2752$ | $n_4 = 1.7552$ | $\nu_4 = 27.51$ |
| $r_9 = 15.5428$ | | | |
| | $d_9 = 2.2256$ | | |
| $r_{10} = 64.1271$ | | | |
| | $d_{10} = 2.2$ | $n_5 = 1.6968$ | $\nu_5 = 55.52$ |
| $r_{11} = -10.465$ | | | |
| | $d_{11} = 0.15$ | | |
| $r_{12} = 10.9796$ | | | |
| | $d_{12} = 3.5$ | $n_6 = 1.6968$ | $\nu_6 = 55.52$ |
| $r_{13} = -9.0363$ | | | |
| | $d_{13} = 0.8$ | $n_7 = 1.84666$ | $\nu_7 = 23.78$ |
| $r_{14} = -29.6735$ | | | |
| | $d_{14} = 1.0$ | | |
| $r_{15} = \infty$ | | | |
| | $d_{15} = 6.0$ | $n_8 = 1.51633$ | $\nu_8 = 64.15$ |
| $r_{16} = \infty$ | | | |

| | |
|---|---|
| $f_{LX} = 8.0$ | $l = 2.9$ |
| $f_{LY} = 6.0$ | $l = 2.2$ |
| $F = 2.8$ | $\omega = 20°$ |

EMBODIMENT 2

Figure 4A:
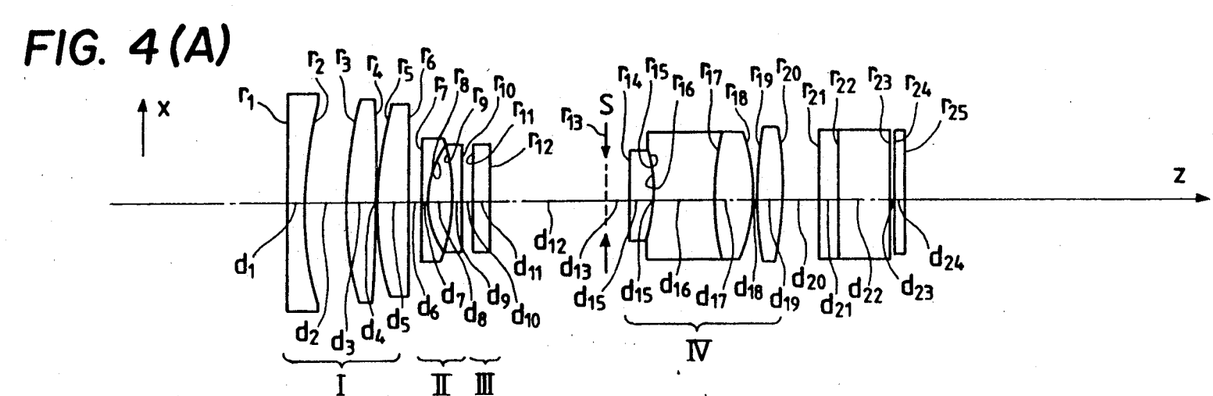
Figure 4B:
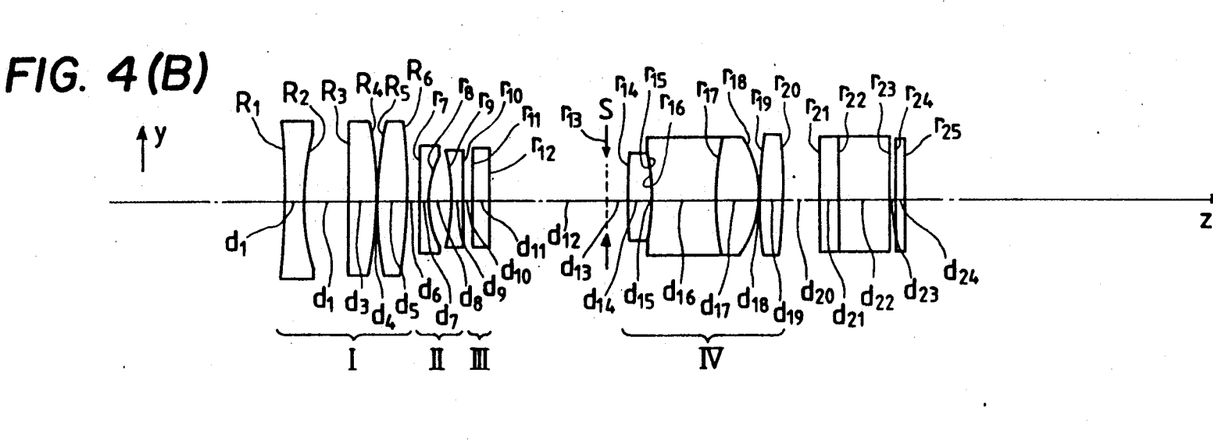

Lens arrangement in Embodiment 2 of the present invention is shown in FIG. 4, wherein the reference symbol (A) represents the x-z section and the reference symbol (B) designates the y-z section.

The Embodiment 2 is designed as a zoom lens system comprising four lens components. The lens component I which is arranged on the most object side serves for focusing the imaging optical system, whereas the second lens component II and the third lens component III are movable along the optical axis for varying focal length of the imaging optical system as a whole. The fourth lens component IV is always kept stationary. The plate arranged after the fourth lens component IV corresponds to filters such as an infrared cut filter and an optical low pass filter, whereas the reference symbol S represents an aperture stop.

The Embodiment 2 has the following numerical data:

$r_1 = 193.0$
$d_1 = 1.2$, $n_1 = 1.80518$, $\nu_1 = 25.43$
$r_2 = 29.0563$
$d_2 = 4.0$
$r_3 = 35.3314$
$d_3 = 2.3$, $n_2 = 1.72$, $\nu_2 = 50.25$
$r_4 = -451.1343$
$d_4 = 0.15$
$r_5 = 24.7681$
$d_5 = 2.5$, $n_3 = 1.762$, $\nu_3 = 40.1$
$r_6 = 254.5341$
$d_6 = $ variable
$R_1 = -42.3202$
$d_1$
$R_2 = 19.1816$
$d_2$
$R_3 = 79.833$
$d_3$
$R_4 = -37.7706$
$d_4$
$R_5 = 24.7709$
$d_5$
$R_6 = -43.6582$
$d_6$
$r_7 = 29.9207$
$d_7 = 0.9$, $n_4 = 1.6968$, $\nu_4 = 56.49$
$r_8 = 8.3956$
$d_8 = 2.0$
$r_9 = -12.8964$
$d_9 = 0.8$, $n_5 = 1.617$, $\nu_5 = 62.79$
$r_{10} = 105.4936$
$d_{10} = $ variable
$r_{11} = 31.0034$
$d_{11} = 1.6$, $n_6 = 1.84666$, $\nu_6 = 23.78$
$r_{12} = -108.1124$
$d_{12} = $ variable
$r_{13} = \infty$ (stop)
$d_{13} = 1.8$
$r_{14} = 34.3689$
$d_{14} = 2.1$, $n_7 = 1.7847$, $\nu_7 = 26.22$
$r_{15} = -13.9941$
$d_{15} = 0.33$
$r_{16} = -9.1439$
$d_{16} = 4.8296$, $n_8 = 1.80518$, $\nu_8 = 25.43$
$r_{17} = 16.9225$
$d_{17} = 3.6$, $n_9 = 1.58913$, $\nu_9 = 60.97$
$r_{18} = -10.8659$
$d_{18} = 0.2$
$r_{19} = 43.2673$
$d_{19} = 2.1$, $n_{10} = 1.60311$, $\nu_{10} = 60.7$
$r_{20} = -28.1789$
$d_{20} = 3.0$
$r_{21} = \infty$
$d_{21} = 1.6$, $n_{11} = 1.51633$, $\nu_{11} = 64.15$
$r_{22} = \infty$
$d_{22} = 4.4$, $n_{12} = 1.54771$, $\nu_{12} = 62.83$
$r_{23} = \infty$
$d_{23} = 0.5$
$r_{24} = \infty$
$d_{24} = 0.6$, $n_{13} = 1.51633$, $\nu_{13} = 64.15$
$r_{25} = \infty$

| | | | |
|---|---|---|---|
| f | 10.3 | 14.13 | 19.4 |
| $d_6$ | 1.0 | 5.651 | 9.738 |
| $d_{10}$ | 0.8 | 1.2 | 0.8 |
| $d_{12}$ | 9.738 | 4.687 | 1.0 |

$f_{LK} = 10.3 \sim 19.4$, $I = 4.2$
$f_{LY} = 8.23 \sim 15.5$, $I = 3.36$
$F = 2.8$, $\omega = 22.2° \sim 12.2°$

EMBODIMENT 3

Figure 5A:
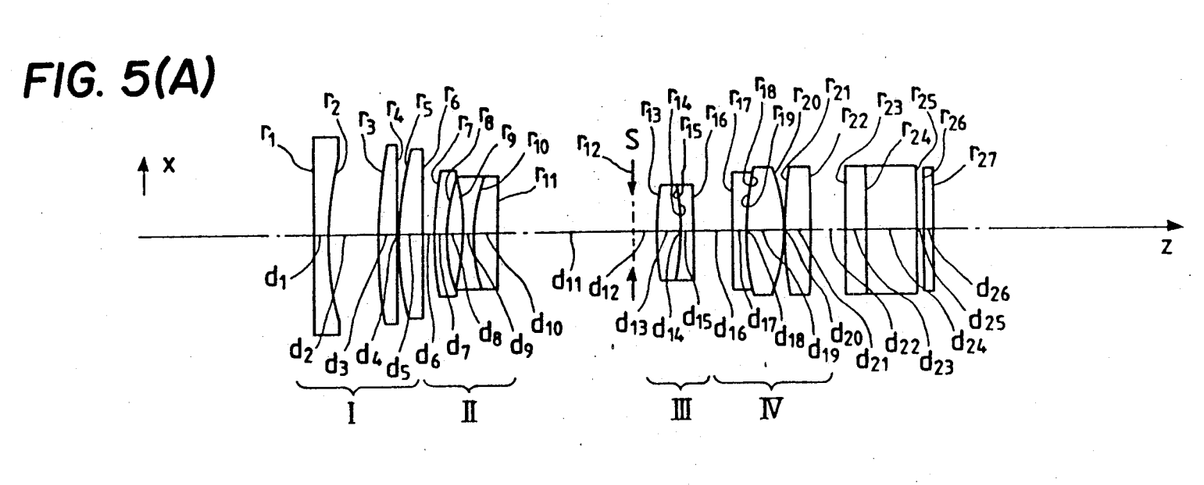
Figure 5B:
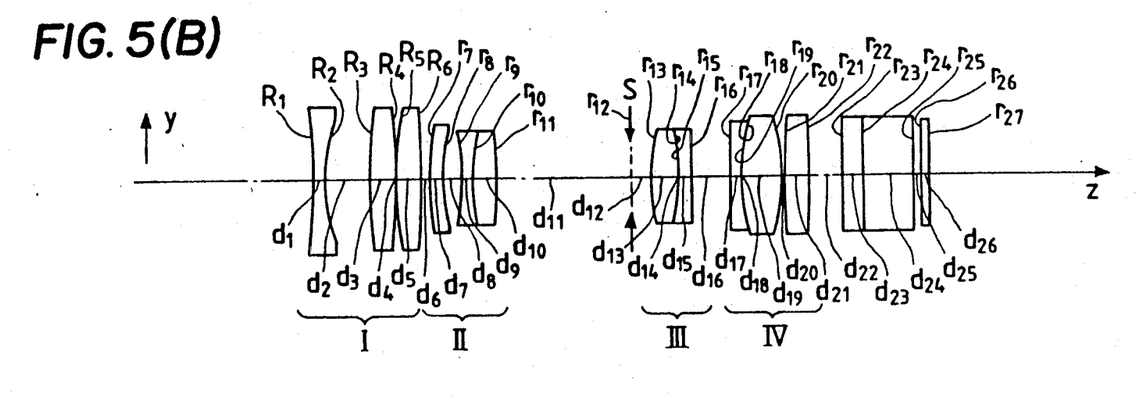

Lens arrangement in Embodiment 3 is illustrated in FIG. 5, wherein the reference symbol (A) represents the x-z section and the reference symbol (B) designates the y-z section.

The Embodiment 3 also comprises four lens components. The first lens component I is always kept fixed, whereas the second lens component II and the third lens component III are movable for varying focal length of the imaging optical system as a whole. Further, the imaging optical system is focused by moving the fourth lens component IV along the optical axis.

Numerical data of the Embodiment 3 are listed below:

$r_1 = 262.6357$
$d_1 = 1.2$, $n_1 = 1.80518$, $\nu_1 = 25.43$
$r_2 = 32.1189$
$d_2 = 4.0$
$r_3 = 35.6036$
$d_3 = 1.9$, $n_2 = 1.72$, $\nu_2 = 50.25$
$r_4 = 379.3918$
$d_4 = 0.15$
$r_5 = 29.0961$
$d_5 = 2.1$, $n_3 = 1.762$, $\nu_3 = 40.1$
$r_6 = -87967.3801$
$d_6 = $ variable
$R_1 = -45.1298$
$d_1$
$R_2 = 17.6911$
$d_2$
$R_3 = 53.7948$
$d_3$
$R_4 = -67.9744$
$d_4$
$R_5 = 26.3624$
$d_5$
$R_6 = -36.2692$
$d_6$
$r_7 = 21.8301$
$d_7 = 0.9$, $n_4 = 1.8348$, $\nu_4 = 37.16$
$r_8 = 9.6697$
$d_8 = 1.92$
$r_9 = -13.4708$
$d_9 = 0.8$, $n_5 = 1.6223$, $\nu_5 = 53.2$
$r_{10} = 15.0561$
$d_{10} = 2.1$, $n_6 = 1.80518$, $\nu_6 = 25.43$
$r_{11} = -47.9894$
$d_{11} = $ variable
$r_{12} = \infty$ (stop)
$d_{12} = 1.8$
$r_{13} = 23.1921$
$d_{13} = 2.3$, $n_7 = 1.801$, $\nu_7 = 34.97$
$r_{14} = -11.6696$
$d_{14} = 0.17$
$r_{15} = -9.4168$
$d_{15} = 0.8$, $n_8 = 1.74$, $\nu_8 = 28.29$
$r_{16} = -595.8074$
$d_{16} = $ variable
$r_{17} = -147.3997$
$d_{17} = 0.8$, $n_9 = 1.84666$, $\nu_9 = 23.78$
$r_{18} = 15.9896$ -continued

| | | | |
|---|---|---|---|
| $r_{19} = 18.3792$ | $d_{18} = 0.11$ | | |
| | $d_{19} = 3.6$ | $n_{10} = 1.6968$ | $\nu_{10} = 55.52$ |
| $r_{20} = -12.9613$ | $d_{20} = 0.2$ | | |
| $r_{21} = 87.411$ | | | |
| | $d_{21} = 1.9$ | $n_{11} = 1.6968$ | $\nu_{11} = 55.52$ |
| $r_{22} = -47.4639$ | $d_{22} = $ variable | | |
| $r_{23} = \infty$ | | | |
| | $d_{23} = 1.6$ | $n_{12} = 1.51633$ | $\nu_{12} = 64.15$ |
| $r_{24} = \infty$ | | | |
| | $d_{24} = 4.4$ | $n_{13} = 1.54771$ | $\nu_{13} = 62.83$ |
| $r_{25} = \infty$ | | | |
| | $d_{25} = 0.5$ | | |
| $r_{26} = \infty$ | | | |
| | $d_{26} = 0.6$ | $n_{14} = 1.51633$ | $\nu_{14} = 64.15$ |
| $r_{27} = \infty$ | | | |

| f | 10.3 | 14.13 | 19.4 |
|---|---|---|---|
| $d_6$ | 0.7 | 6.036 | 11.114 |
| $d_{11}$ | 11.414 | 6.078 | 1.0 |
| $d_{16}$ | 3.479 | 3.232 | 3.45 |
| $d_{22}$ | 3.0 | 3.247 | 3.029 |

$f_{LX} = 10.3 \sim 19.4$   $I = 4.2$
$f_{LY} = 8.24 \sim 15.53$   $I = 3.36$
$F = 2.8$   $\omega = 22.2° \sim 12.2°$ In the numerical data of the Embodiments 1 through 3 described above, the reference symbols $r_i$ and $R_j$ represent radii of curvature on the i'th and j'th surfaces respectively, the reference symbol $d_i$ designates the airspace reserved between the i'th surface and the i+1'th surface, the reference symbol $n_k$ denotes the refractive index of the k'th lens element, the reference symbol $\nu_K$ represents the Abbe's number of the k'th lens element, the reference symbols $f_{LX}$ and $f_{LY}$ designate the focal lengths of the imaging optical system as a whole on the x-z section and the y-z section respectively, the reference symbol I denotes the image height, the reference symbol F represents the F number of the imaging optical system, and the reference symbol $\omega$ designates the half field angle of the imaging optical system. In addition, the reference symbol $r_i$ represents the radius of curvature on the x-z section and the reference symbol $R_j$ designates the radius of curvature on the y-z section.

In each of the Embodiments 1 through 3 described above, toric surfaces having radii of curvature different between the x-z section and the y-z section are used in the first lens component I so that the first lens component has focal lengths different between the two sections and focal points which are nearly coincident between the two sections.

EMBODIMENT 4

Figure 6A:
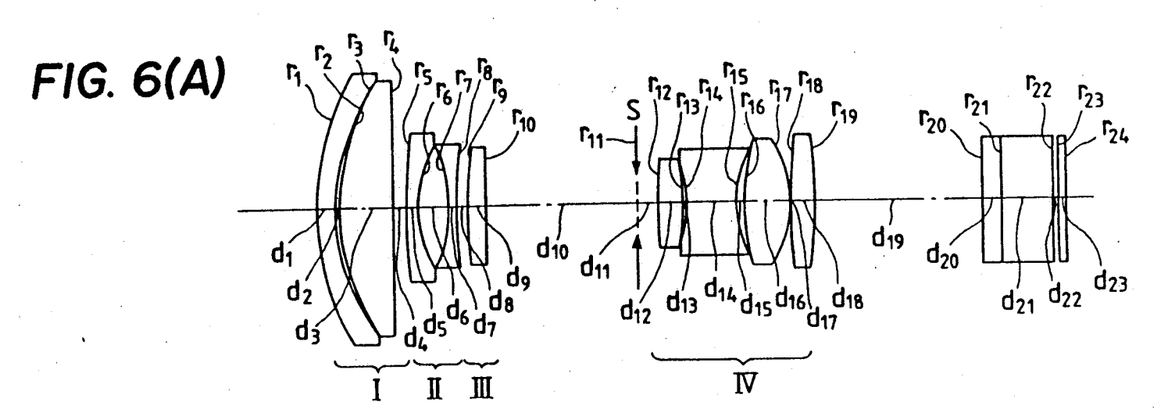
Figure 6B:
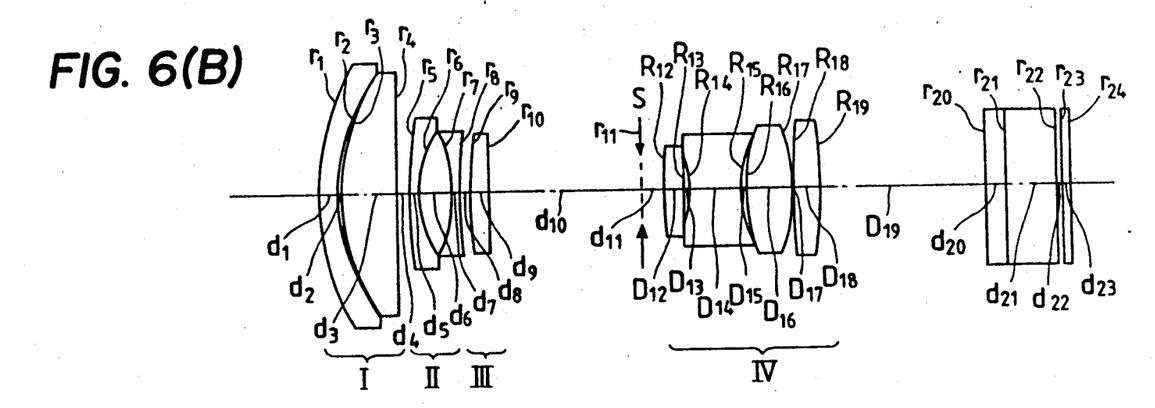

FIG. 6 illustrates lens arrangement in Embodiment 4 of the present invention which is preferred as an example of the anamorphic optical system described with reference to FIG. 2. In FIG. 6, the reference symbol (A) represents the x-z section, the reference symbol (B) designates the y-z section and the x direction corresponds to the horizontal scanning direction on the image sensor. As is seen from this drawing, the lens system preferred as the Embodiment 4 comprises, in the order from the object side, a first lens component I having a positive refractive power, a second lens component II having a negative refractive power and movable along the optical axis for varying magnification of the imaging optical system, a third lens component III having a positive refractive power and movable along the optical axis for varying magnification of the imaging optical system, and a fourth lens component IV having a positive refractive power and an imaging function, as well as aperture stop S arranged between the third lens component III and the fourth lens component IV. The plane plate arranged after the fourth lens component IV corresponds to filters such as an infrared cut filter, an optical low pass filter, etc. which are similar to those already described above. This optical system comprises lens elements whose focal lengths are different between the horizontal scaning direction and the vertical scanning direction on the image sensor 2, and has as imaging magnification in the vertical direction higher than that in the horizontal direction. However, since the optical system must have focal points which are nearly coincident in all the directions, it is necessary to pay attention to the points described below:

When an anamorphic optical system is composed of toric surfaces, etc., the imaging lens system 1 has focal lengths which are different between the x-z section and y-z section under the influence produced by the partial lens system located between the most object side toric surface and the most image side toric surface. It is therefore necessary that partial lens system has image points which are nearly coincident between the two sections. However, this partial lens system has only one conjugate point which is common to the two sections. Accordingly, this partical lens system must not be moved for focusing. In order to keep the object point for this partical lens system always at a constant location, it is always necessary for focusing to move another partical lens system located on the object side of the above-mentioned partical system.

Further, when the azimuth (tilt around the optical axis) of the partial lens system comprising the lens elements having focal lengths different between the two directions is varied, the image is deformed in indefinite directions and not clearly visible.

For the reason described above, the Embodiment 4 comprises an anamorphic lens element in the fourth lens component which is not moved for zooming or focusing.

In addition, when a zoom lens system comprises an anamorphic lens elements arranged in a lens component which contributes to variation of magnification, it is different to obtain a magnification variation ratio which is the same between two directions. From this viewpoint also, it is advantageous to arrange the anamorphic lens elements in a lens component which is always kept fixed.

The Embodiment 4 of the present invention has the following numerical data:

| | | | |
|---|---|---|---|
| $r_1 = 22.9782$ | | | |
| | $d_1 = 1.5$ | $n_1 = 1.84666$ | $\nu_1 = 23.78$ |
| $r_2 = 16.5102$ | $d_2 = 0.3$ | | |
| $r_3 = 17.8333$ | | | |
| | $d_3 = 4.7$ | $n_2 = 1.72916$ | $\nu_2 = 54.68$ |
| $r_4 = \infty$ | $d_4 = $ variable | | |
| $r_5 = 37.6803$ | | | |
| | $d_5 = 0.9$ | $n_3 = 1.6968$ | $\nu_3 = 56.49$ |
| $r_6 = 8.9763$ | $d_6 = 2.58$ | | |
| $r_7 = -13.9148$ | | | |
| | $d_7 = 0.8$ | $n_4 = 1.617$ | $\nu_4 = 62.79$ |
| $r_8 = 52.3345$ | $d_8 = $ variable | | |
| $r_9 = 26.918$ | | | |
| | $d_9 = 1.7$ | $n_5 = 1.84666$ | $\nu_5 = 23.78$ |
| $r_{10} = \infty$ | | | |

-continued

| | | | |
|---|---|---|---|
| $r_{11} = \infty$ (stop) | $d_{10}$ = variable | | |
| $r_{12} = 29.4596$ | $d_{11} = 1.8$ | | |
| $r_{13} = -14.4996$ | $d_{12} = 2.1$ | $n_6 = 1.80518$ | $\nu_6 = 25.43$ |
| $r_{14} = -9.1605$ | $d_{13} = 0.33$ | | |
| $r_{15} = 15.0204$ | $d_{14} = 4.4237$ | $n_7 = 1.80518$ | $\nu_7 = 25.43$ |
| $r_{16} = 17.2834$ | $d_{15} = 0.4$ | | |
| $r_{17} = -10.5496$ | $d_{16} = 3.85$ | $n_8 = 1.58913$ | $\nu_8 = 60.97$ |
| $r_{18} = 61.6049$ | $d_{17} = 0.2$ | | |
| $r_{19} = -28.4625$ | $d_{18} = 2.1$ | $n_9 = 1.65844$ | $\nu_9 = 50.86$ |
| $R_{12} = 14.1276$ | $d_{19} = 13.8$ | | |
| $R_{13} = -13.1097$ | $D_{12} = d_{12}$ | $N_6 = n_6$ | $V_6 = \nu_6$ |
| $R_{14} = -10.9672$ | $D_{13} = d_{13}$ | | |
| $R_{15} = 11.5472$ | $D_{14} = d_{14}$ | $N_7 = n_7$ | $V_7 = \nu_7$ |
| $R_{16} = 17.0453$ | $D_{15} = d_{15}$ | | |
| $R_{17} = -13.7064$ | $D_{16} = d_{16}$ | $N_8 = n_8$ | $V_8 = \nu_8$ |
| $R_{18} = 273.7502$ | $D_{17} = d_{17}$ | | |
| $R_{19} = -53.4914$ | $D_{18} = d_{18}$ | $N_9 = n_9$ | $V_9 = \nu_9$ |
| $r_{20} = \infty$ | $D_{19} = d_{19}$ | | |
| $r_{21} = \infty$ | $d_{20} = 1.6$ | $n_{10} = 1.51633$ | $\nu_{10} = 64.15$ |
| $r_{22} = \infty$ | $d_{21} = 4.4$ | $n_{11} = 1.54771$ | $\nu_{11} = 62.83$ |
| $r_{23} = \infty$ | $d_{22} = 0.5$ | | |
| $r_{24} = \infty$ | $d_{23} = 0.6$ | $n_{12} = 1.51633$ | $\nu_{12} = 64.15$ |

| f | $f_W$ | $f_S$ | $f_T$ |
|---|---|---|---|
| $d_4$ | 1.0 | 7.459 | 12.749 |
| $d_8$ | 0.8 | 1.8 | 0.8 |
| $d_{10}$ | 12.749 | 5.29 | 1.0 |

$f_{LX} = 10.3 \sim 26.19$, $f_{LY} = 13.74 \sim 34.92$,
$F_X/2.7$, $F_Y/3.6$, $IH = 4.7$ wherein the reference symbols $r_i$ and $R_j$ represent the radii of curvature on each lens surface, the reference symbols $d_i$ and $D_j$ designate the spaces between the lens surfaces, the reference symbols $n_i$ and $N_j$ denote the refractive indices of each lens element, the reference symbols $\nu_i$ and $V_j$ represent the Abbe's numbers of each lens element, the reference symbols $f_{LX}$ and $f_{LY}$ designate the focal lengths of the imaging optical system as a whole on the x-z section and the y-z section respectively, the reference symbols $F_X$ and $F_Y$ denote the F numbers of the imaging optical system on the x-z section and the y-z section respectively, the symbol IH represent the image height, the reference symbols $f_W$, $f_S$ and $f_T$ designate the focal lengths of the imaging optical system as a whole at the wide position, standard position and tele position respectively.

I claim:

1. An electronic imaging apparatus comprising:
an imaging optical system including an imaging lens system for forming an image of an object at magnifications different between an x-z section and a y-z section when the object is placed on a z-axis in a three dimensional x-y-z space and an image sensor having a photoelectric converting surface substantially perpendicular to the z-axis for receiving said object image; and
a video signal processing circuit connected to said image sensor for changing a difference in expansion/contraction ratios between a scanning direction and a direction perpendicular thereto for reproducing said object image with video signals obtained from said image sensor;
wherein said imaging optical system comprises an anamorphic optical system and satisfies the condition:

$$|\Delta d| < 2\delta F/\beta^2$$

wherein $\Delta d$ is the paraxial astigmatic difference in image between the x-z section and the y-z section of said anamorphic optical system, $\delta$ is the length of the shorter side of each pixel element of the image sensor, F is the F number of the imaging lens system, and $\beta$ is the magnification of the optical system located on the image side of said anamorphic optical system.

2. An electronic imaging apparatus comprising:
an imaging optical system including an imaging lens system for forming an image of an object at magnifications different between an x-z section and a y-z section when the object is placed on a z-axis in a three dimensional x-y-z space and an image sensor having a photoelectric converting surface substantially perpendicular to the z-axis for receiving said object image; and
a video signal processing circuit connected to said image sensor and functioning to generate video signals for displaying an image substantially similar to said object on the basis of output signals from said image sensor;
wherein said imaging optical system comprises an anamorphic optical system and satisfies the condition:

$$|\Delta d| < 2\delta F/\beta^2$$

wherein $\Delta d$ is the paraxial astigmatic difference in image between the x-z section and the y-z section of said anamorphic optical system, $\delta$ is the length of the shorter side of each pixel element of the image sensor, F is the F number of the imaging lens system, and $\beta$ is the magnification of the optical system located on the image side of said anamorphic optical system.

3. An electronic imaging apparatus comprising:
an imaging optical system including an imaging lens system for forming an image of an object at magnifications different between an x-z section and a y-z section when the object is placed on a z-axis in a three dimensional x-y-z space and an image sensor having a photoelectric converting surface substantially perpendicular to the z-axis for receiving said object image; and
a video signal processing circuit connected to said image sensor for changing a difference in expansion/contraction ratios between a scanning direction and a direction perpendicular thereto for reproducing said object image with video signals obtained from said image sensor;
wherein said imaging optical system includes toric surfaces different in radius of curvature between the x-z section and the y-z section;

wherein said imaging optical system comprises an anamorphic optical system and satisfies the condition:

$$|\Delta d| < 2\delta F/\beta^2$$

wherein $\Delta d$ is the paraxial astigmatic difference in image between the x-z section and the y-z section of said anamorphic optical system, $\delta$ is the length of the shorter side of each pixel element of the image sensor, F is the F number of the imaging lens system, and $\beta$ is the magnification of the optical system located on the image side of said anamorphic optical system.

* * * * *